United States Patent
Durand et al.

(10) Patent No.: US 6,362,290 B2
(45) Date of Patent: Mar. 26, 2002

(54) GAS PHASE POLYMERIZATION PROCESS

(75) Inventors: Daniel Durand, Martigues; Frederic Robert Marie Michel Morterol, Sausset les Pins, both of (FR)

(73) Assignee: BP Chemicals Limited, London (GB)

(*) Notice: Subject to any disclaimer, the term of this patent is extended or adjusted under 35 U.S.C. 154(b) by 0 days.

(21) Appl. No.: 09/891,198

(22) Filed: Jun. 26, 2001

Related U.S. Application Data

(63) Continuation of application No. 09/010,852, filed on Jan. 22, 1998, now Pat. No. 6,284,848.

(30) Foreign Application Priority Data

Jan. 24, 1997 (FR) .............................. 97 00971

(51) Int. Cl.$^7$ .................................. C08F 2/34
(52) U.S. Cl. ........................... 526/68; 526/70; 526/88; 526/901; 526/918; 526/920
(58) Field of Search ............... 526/68, 70, 88, 526/901, 918, 920

(56) References Cited

U.S. PATENT DOCUMENTS

| | | | |
|---|---|---|---|
| 4,518,750 A | * 5/1985 | Govoni et al. | 526/68 |
| 4,665,143 A | * 5/1987 | Ahluwaila et al. | 526/88 |
| 5,376,742 A | 12/1994 | Krause | 526/68 |
| 6,013,741 A | * 1/2000 | Ohtani et al. | 526/84 |

FOREIGN PATENT DOCUMENTS

| | | |
|---|---|---|
| EP | 0 004 966 A2 | 10/1979 |
| EP | 0 099 660 A1 | 2/1984 |
| EP | 0 241 947 A2 | 10/1987 |
| EP | 0 360 094 A | 3/1990 |
| EP | 0 634 421 A1 | 1/1995 |
| JP | 61-81406 | * 4/1986 |
| JP | 61-81406 | 4/1998 |
| WO | WO 94/28032 | 12/1994 |

* cited by examiner

*Primary Examiner*—David W. Wu
*Assistant Examiner*—R. Rabago
(74) *Attorney, Agent, or Firm*—Finnegan, Henderson, Farabow, Garrett & Dunner, L.L.P.

(57) ABSTRACT

The present invention relates to a process for continuous gas phase polymerization of olefin(s) in a reactor containing a fluidized bed, consisting of a cylinder with a vertical side wall and of a desurging or disengagement chamber (3) mounted above the said cylinder, characterized in that the fluidized bed occupies at least all of the cylinder with a vertical side wall of the reactor.

17 Claims, 2 Drawing Sheets

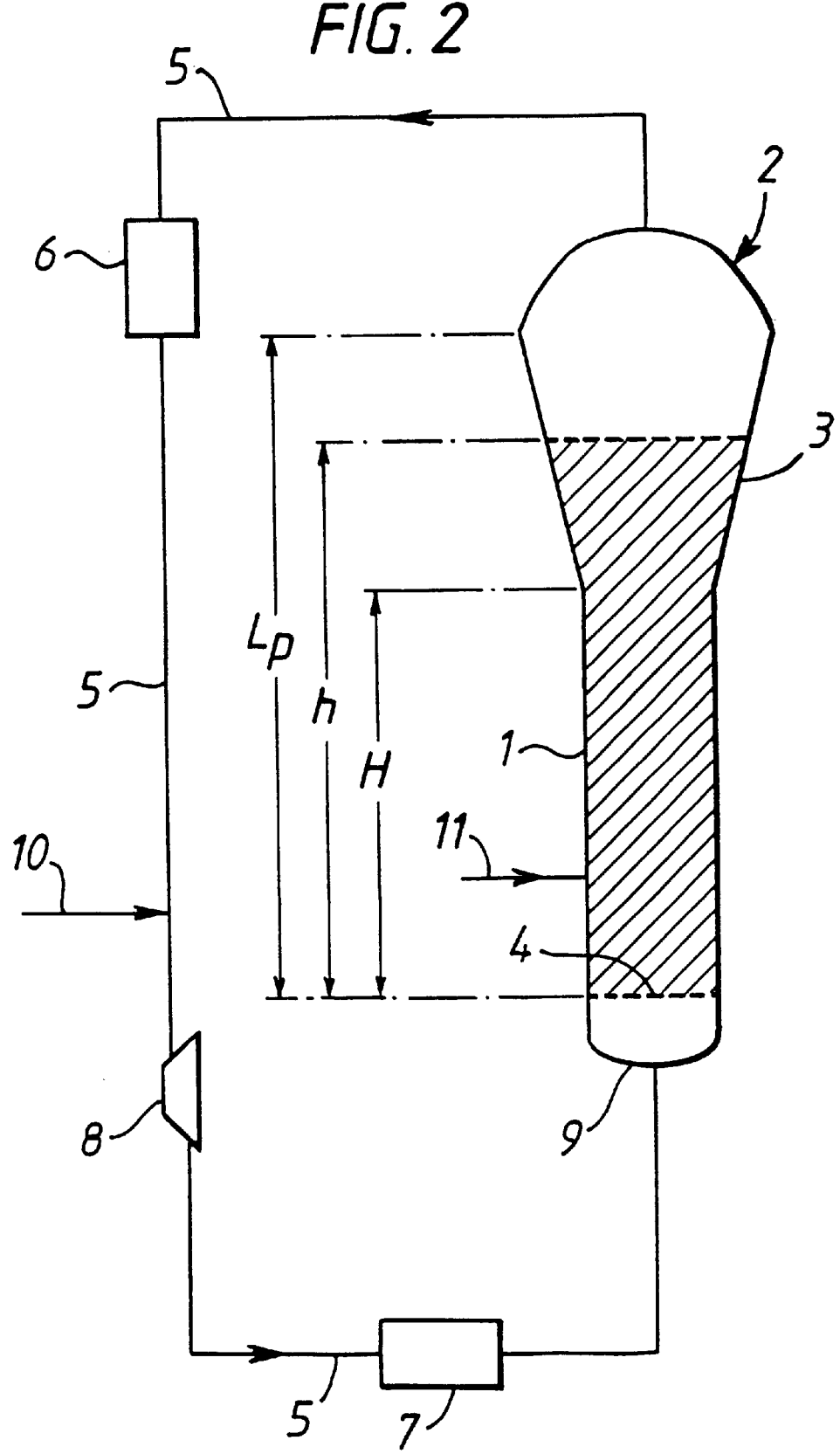

GAS PHASE POLYMERIZATION PROCESS

This is a continuation of application Ser. No. 09/010,852 filed Jan. 22, 1998, now U.S. Pat. No. 6,284,848 incorporated herein by reference.

The present invention relates to a process for gas phase polymerization in a fluidized-bed reactor.

It is known to polymerize one or more monomers in the gas phase at a pressure higher than atmospheric pressure in a fluidized-bed reactor where particles of polymer being formed are maintained in the fluidized state by virtue of a reaction (as mixture containing the monomer(s) to be polymerized travelling in a rising stream. The polymer thus manufactured in powder form is generally drained from the reactor in order to keep the bed at a more or less constant volume. A process which is preferred on the industrial scale employs a fluidization grid which distributes the reaction gas mixture through the bed and which acts as a support for the bed in the event of a cut in the flow of the rising gas. The reaction gas mixture leaving at the top of the fluidized-bed reactor is recycled to the base of the latter under the fluidization grid by means of an external circulation conduit provided with a compressor.

The polymerization of the monomers is an exothermic reaction. It is therefore necessary to provide a suitable means for cooling the bed in order to extract the heat of polymerization therefrom. The preferred method for the polymerization of olefins in a fluidized bed consists in cooling the reaction gas mixture below the polymerization temperature, and, when this fluidization gas passes through the bed, this makes it possible to compensate for the excess heat generated by the polymerization. Thus, as it is being returned the reaction gas mixture is generally cooled with the aid of at least one heat exchanger arranged on the outer circulation conduit so as to remove the heat produced by the polymerization reaction and to keep the polymerization temperature at the desired level.

Attempts have been made, very particularly in recent years, to optimize the gas phase polymerization process so as to increase the output of polymer in existing plants. The thinking has accordingly been in terms of rate of production of polymer, namely in terms of weight yield of polymer produced per unit volume of the reactor and per unit of time ($kg/h/m^3$). In commercial fluidized-bed reactors of the abovementioned type it is known that the output rate depends directly on the rate of removal of heat generated in the reactor. This rate of removal can be increased, for example by increasing the speed of the fluidizing gas and/or by reducing the temperature of the fluidizing gas and/or by increasing the heat capacity of the fluidizing gas.

For example, in its patent application WO 94/28032 BP Chemicals Limited has proposed a process for gas phase polymerization of olefin(s), in which the recycle gas stream is cooled to a sufficient temperature to form a liquid and a gas. By separating the liquid from the gas and by introducing the liquid directly into the fluidized bed it is possible to increase the total quantity of liquid introduced into the fluidized-bed reactor, and this makes it possible to cool the bed better by evaporation and hence to reach higher output efficiency levels.

In general, fluidized-bed reactors according to the present invention can be represented by a first volume, the enclosure (wall) of which consists of at least one surface of revolution generated by the rotation about a vertical axis known as axis of revolution, of a rectilinear and/or curved segment, above which is mounted a second volume, commonly called a disengagement vessel, the enclosure (wall) of which also consists of at least one surface of revolution generated by the rotation, about the same vertical axis known as axis of revolution, of a rectilinear and/or curved segment. According to its definition of disengagement vessel, the orthogonal section of the second volume (at the location situated just above the junction between the two volumes) is higher than the orthogonal section of the first volume (at the location situated at its upper point). Conventional fluidized-bed reactors employed for the gas phase polymerization of olefin(s) usually consist of a cylinder (1) with a vertical axis above which is mounted a disengagement vessel (3) in accordance with FIG. 1, which shows diagrammatically a preferred apparatus for the gas phase polymerization according to the present invention.

The known essential function of the disengagement vessel is to slow down the rising gas stream which, after having passed through the fluidized bed, can entrain relatively large quantities of solid particles. As a result, most of the entrained solid particles return directly into the fluidized bed. Only the finest particles can be entrained out of the rector.

In principle, the fluidized bed could occupy all of the cylindrical part of the reactor, a part which rises over a height H starting from the base of the fluidized bed, which generally coincides with the fluidization grid (4). In practice the fluidized bed generally occupies only a portion of the cylindrical part of the fluidized-bed reactor, with the result that the real height of the fluidized bed (h) is equivalent to 0.95×H, preferably 0.90×H, and in particular 0.85×H. This height limit of the fluidized bed has been dictated by the person skilled in the art in order to avoid excessive entrainment of polymer particles out of the reactor. Studies of fluidization have shown the formation of bubbles within the fluidized bed. Coalescence of the bubbles takes place as they rise within the bed until they burst when they reach the upper part of the fluidized bed. This bursting considerably accelerates the entrainment of the particles out of the reactor. All this has therefore naturally led the person skilled in the art to limit the height of the fluidized bed in a practical manner during the polymerization.

Within the context of research related to the increase in the output efficiency of its industrial plants for gas phase polymerization of olefins, the Applicant Company has succeeded, despite existing prejudices, in developing a simple and reliable process which makes it possible to increase considerably the output of polymers. In addition, the Applicant Company has completely unexpectedly discovered that the use of its new process offers many advantages as disclosed in the description which follows.

The present invention consists therefore of a process for gas phase polymerization in a fluidized-bed reactor consisting of a first volume, the enclosure (wall) of which consists of at least one surface of revolution generated by the rotation, about a vertical axis known as axis of revolution, of a rectilinear and/or curved segment, above which is mounted a second volume, commonly called a disengagement vessel, adjoining the first volume, the enclosure (wall) of which also consists of at least one surface of evolution generated by the rotation, about the same vertical axis known as axis of revolution, of a rectilinear and/or curved segment, characterized in that the fluidized bed occupies at least all of the first volume of the reactor. Thus, according to the present invention the height of the fluidized bed (h) is at least equal to the height H of the polymerization reactor. The fluidized bed preferably occupies at least partially the second volume known as a disengagement vessel.

Unexpectedly, the Applicant Company has discovered that the process according to the present invention does not in any way lead to excessive entrainment of polymer particles out of the reactor. Although not wishing to be bound to the following explanation, the Applicant Company thinks that this finding originates, on the one hand, from the fact that the particles undergo a deceleration when they reach the disengagement vessel and, on the other hand, because the bubbles are limited and/or reduced in size when they enter the disengagement vessel.

BRIEF DESCRIPTION OF THE DRAWINGS

FIG. 2 illustrates a gas-phase polymerization process of the present invention.

Figure 1:
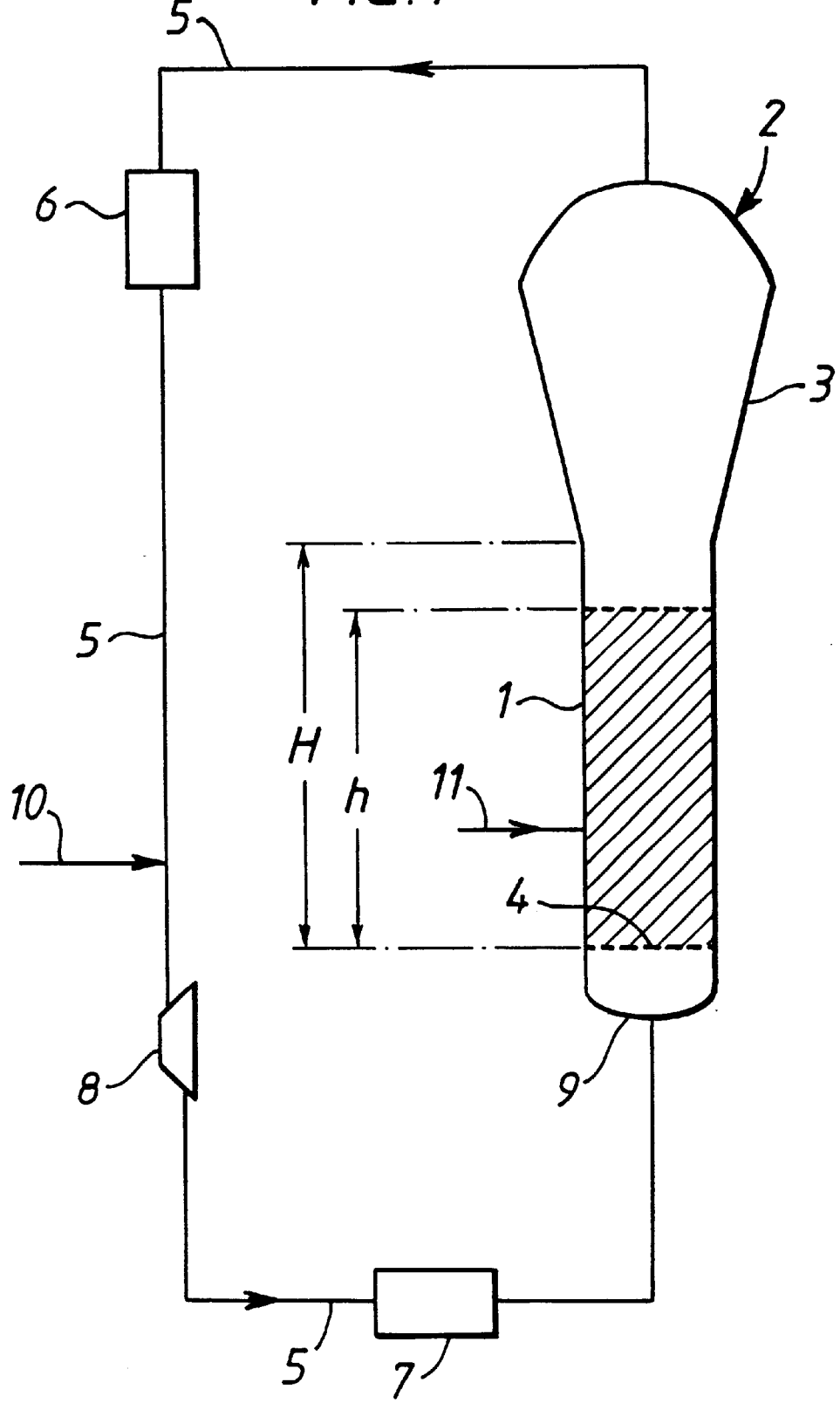
FIG. 1 illustrates a conventional gas-phase polymerization process.

Although not wishing to be limited to one type of polymerization in particular, the present invention is particularly appropriate for reactions of polymerization of one or more monomers such as olefins, polar vinyl monomers, dienes, acetylenes and aldehydes.

The process according to the present invention preferably applies to the polymerization of one or more olefinic monomers such as ethylene, propylene, 1-butene, 1-pentene, 4-methyl-1-pentene, 1-hexene and 1-octene.

According to the present invention it is possible to decide to polymerize intermittently with a bed height in accordance with the present invention and with a bed height lower than that of the invention. However, it is preferable to perform the polymerization with a bed height constantly within the range of the present invention.

As indicated above, the height H of the polymerization reactor is defined as being the distance separating the base of the fluidized bed, a base which generally coincides with the fluidization grid, and the junction between the first volume or lower volume and the second volume called a disengagement vessel. In the preferred case of the cylinder with a vertical axis, H therefore represents the length of the vertical side wall of the cylinder rising above the base of the fluidized bed.

According to a preferred embodiment of the present invention the height of the fluidized bed (h) is greater than the height H of the reactor, preferably greater than 1.05×H and in particular greater than 1.1×H.

The disengagement vessel mounted above the cylinder liable to contain the fluidized bed has, in principle, a cross-section which is greater than that of the cylinder. It is preferably in the shape of a bulb consisting essentially of a conical frustum of revolution with a vertical axis coinciding with the axis of the cylinder, with apex pointing downwards with preferably an angle of between 10° and 60° and with a dome of substantially hemispherical shape mounted above it. The small base of this conical frustum coincides with the upper end of the cylinder of the reactor, and its large base coincides with the base of the dome. It can also consist of a vertical cylinder which is joined to the cylinder liable to contain the fluidized bed by a joining surface in the shape of a widened conduit. In this case this cylinder has a vertical axis coinciding with the axis of the cylinder liable to contain the fluidized bed and a roof generally of substantially hemispherical shape.

According to a preferred embodiment of the present invention the height of the fluidized bed (h) is such that the volume of the disengagement vessel occupied by the fluidized bed represents more than 5% of the total volume of the vessel, preferably more than 10%, more preferably more than 15%. According to a preferred embodiment of the present invention the height of the fluidized bed (h) is such that the volume of the disengagement vessel occupied by the fluidized bed represents less than 70% of the total volume of the vessel, preferably less than 50%, more preferably less than 30%.

In the case of the vessel consisting of the conical frustum of revolution with a dome mounted above it, the upper limit of the fluidized bed (h) preferably does not reach the height which corresponds to the largest orthogonal section of the said vessel. This limiting height which it is preferable not to exceed is identified by $L_p$ in FIG. 2.

The presence of the fines in the reactor can affect the properties of the polymer by increasing the gel content of the finished product such as the films and receptacles made of plastic. In addition, during the polymerization, agglomerates can form on the internal wall of the reactor, in particular on the wall of the disengagement vessel. The accumulation of the fines and agglomerates on the wall of the reactor constitute the fouling of the reactor.

To prevent the fouling of the reactor from affecting the operation of the polymerization system and the quality of the polymer produced, the reactor is stopped at regular intervals in order to clean its wall and to remove the agglomerates from it. This can be done by means of water or nitrogen under pressure. Cleaning of this type causes entries of poison into the reactor, and this automatically involves a purge of the reactor and drying in order to remove these poisons. This procedure takes time and is not very economical.

Unexpectedly, the Applicant Company has also discovered that the process according to the present invention makes it possible to reduce and/or to eliminate the problems linked with the fouling of the reactor wall, in particular of the wall of the disengagement vessel.

FIG. 2 shows diagrammatically an illustration of a plant for gas phase polymerization of olefin(s) according to the present invention. The apparatus includes:

(i) a fluidized-bed reactor (1) provided with a dome (2) and with a base comprising a fluidization grid (4) and consisting of a cylinder with a vertical side wall above which is mounted a desurging or disengagement chamber (3) mounted above the said cylinder, the top of the chamber (3) forming the dome (2) of the reactor, (ii) an entry chamber (9) for a reaction gas mixture, situated under the grid (4) and communicating with the cylindrical part of the reactor (1) through the grid (4), and (iii) an outer conduit (5) for circulation of the reaction gas mixture, joining the dome (2) of the reactor to the entry chamber (9) for the reaction gas mixture, and including a compressor (8) and at least one heat exchanger (6,7)

One or more feed conduits (10) for constituents of the reaction gas mixture, such as one or more olefins, for example ethylene or propylene or $C_4$–$C_{10}$ alpha-olefins, one or more, preferably unconjugated, dienes, hydrogen, one or several inert gases such as nitrogen or $C_1$–$C_6$, preferably $C_2$–$C_5$ alkanes, can emerge into the outer circulation conduit (5), in one or more places along this conduit. Another subject of the present invention is a process for continuous gas phase polymerization of olefin(s) in a reactor containing a fluidized and optionally mechanically stirred bed, consisting of a cylinder with a vertical side wall and of a desurging or disengagement chamber (3) mounted above the said cylinder, at an absolute pressure higher than the atmospheric pressure, by continuous or intermittent introduction of a catalyst into the reactor, continuous introduction of olefin(s)

into a reaction gas mixture passing through the reactor in an upward stream, removal of the heat of polymerization by cooling the recycled reaction gas mixture, draining the polymer manufactured, a process characterized in that the fluidized bed occupies at least all of the cylinder with a vertical side wall of the reactor. The fluidized bed accordingly preferably occupies at least partially the said disengagement vessel.

The process of the invention is very particularly suitable for polyolefin powders, especially of high or low linear density polyethylene, for example of relative density ranging from 0.87 to 0.97, or of polypropylene. The polymers manufactured according to the present process may especially be powders corresponding essentially to type B and sometimes to types A and B, according to the classification given by D. Geldart "Gas Fluidization Technology" published in "A. Wiley-Interscience Publication" by John-Wiley & Sons (1986), pages 33 to 46. The polymers may consist of particles which have a mass-average diameter ranging from 300 to 2000, preferably from 500 to 1500 μm.

The process for continuous (,as phase polymerization of olefin(s) is usually carried out in a reactor containing a fluidized and optionally mechanically stirred bed, kept at an absolute pressure $P_1$ which can range from 0.5 to 6, preferably from 1 to 4 MPa. The temperature of the fluidized bed may be maintained at a value lower than the melting point of the polymer, for example at a temperature ranging from 30 to 130° C., preferably from 50 to 110° C. A reaction gas mixture passes through the reactor with an upward speed which can range from 0.3 to 1 m/s, preferably from 0.4 to 0.8 m/s. The reaction gas mixture may contain one or more olefins, especially from $C_2$ to $C_{10}$, preferably from $C_2$ to $C_8$, for example ethylene or propylene, or a mixture of ethylene with at least one $C_3$–$C_{10}$, preferably $C_3$–$C_8$ olefin, for example propylene, 1-butene, 1-hexene, 4-methyl-1-pentane or 1-octene, and/or also with at least one diene, for example an unconjugated diene. It may also contain hydrogen and/or an inert gas such as nitrogen or an alkane, for example from $C_1$ to $C_6$, preferably from $C_2$ to $C_5$, for example pentane and/or isopentane. The polymerization process may in particular be carried out according to the process described in PCT Patent Application No. 94/28032. It may be carried out in the presence of a catalyst comprising at least one transition metal belonging to groups 4, 5 or 6 of the Periodic Classification of the Elements (approved by the Nomenclature Committee of the "American Chemical Society", see "Encyclopaedia of Inorganic Chemistry", editor R Bruce King, published by John Wiley & Sons (1994)). In particular, it is possible to employ a catalyst system of the Ziegler-Natta type including, a solid catalyst comprising a compound of a transition metal such as those mentioned above and a cocatalyst comprising an organometallic compound of a metal belonging to groups 1, 2 or 3 of the Periodic Classification of the Elements, for example an organoaluminium compound. High-activity catalyst systems have already been known for many years and are capable of producing large quantities of polymer in a relatively short time, with the result that it is possible to avoid the stage of removal of the catalyst residues present in the polymer. These high-activity catalyst systems generally include a solid catalyst comprising essentially transition metal, magnesium and halogen atoms. It is also possible to employ a high-activity catalyst essentially comprising a chromium oxide activated by a heat treatment and associated with a granular support based on refractory oxide The polymerization process is very particularly suitable for being employed with metallocene catalysts such as zirconocene, hafnocene, titanocene or chromocene, or silica-supported Ziegler catalysts based, for example, on titanium or vanadium. For example, the metallocene catalysts can be represented by the general formula $(Cp)_mMR_xR1_y$ in which Cp denotes a substituted or unsubstituted cyclopentadienyl ring, M denotes a transition metal of group IV, V or VI of the Periodic Classification of the Elements, such as zirconium, titanium or hafnium, R and R1 being identical or different, denote a hydrocarbon radical containing from 1 to 20 carbon atoms, a halogen atom or another monovalent ligand, m=1 to 3, x=0 to 3 and y=0 to 3, on condition that the sum of m, x and y is equal to the oxidation state of M. Examples of catalyst of metallocene type are found in EP-0129368, U.S. Pat. No. 5,324,800 and EP-0206794. The catalyst may also be a catalyst represented by a compound containing a monocyclopentadienyl heteroatom. Such a catalyst is disclosed, for example, in EP-0416815 and EP-0420436. Catalysts of Ziegler-Natta type, especially high-activity catalysts and in particular catalysts of metallocene type, are preferably employed on a porous support such as a refractory oxide, for example silica or alumina. The abovementioned catalysts or catalyst systems can be employed as they are directly in the fluidized-bed reactor, or converted beforehand to olefin prepolymer, in particular during a prepolymerization bringing the catalyst or catalyst system into contact with one or more olefins such as those mentioned above, in a hydrocarbon liquid medium or in gaseous phase, according, for example, to a noncontinuous or continuous process carried out outside the fluidized-bed polymerization reactor.

According to a preferred embodiment it has been found that the present invention is very particularly suitable when the polymer output rate is higher than 50 kg/h/m$^3$, preferably higher than at 60 kg/h/m$^3$, more preferably higher than 70 kg/h/m$^3$, this being whatever the catalyst system employed.

The process is very particularly suitable for manufacturing polyolefins in powder form, in particular of high or low linear density polyethylene, with a relative density ranging, for example, from 0.87 to 0.97, or of polypropylene, or of copolymers of propylene with ethylene and/or $C_4$–$C_8$ olefins, or elastomeric copolymers of propylene with ethylene and optionally at least one unconjugated diene with a relative density ranging, for example, from 0.85 to 0.87.

The advantages of the process according to the invention are numerous. In fact, the process is not merely simple, reliable and easy to operate but it also makes it possible to increase considerably the output of polymers. By virtue of the new process it is now possible to debottleneck the existing plants easily and less expensively without changing their design. In addition, unexpectedly, the Applicant Company has discovered that the process according to the present invention reduces the entrainment of polymer particles out of the reactors. This improvement results in a new advantage of the present process, by virtue of which it is now possible to work with upward speeds of the reaction gas mixture which are higher than those which were employed previously.

The examples which follow illustrate the present invention.

EXAMPLES

A gas phase copolymerization of ethylene with 1-butene is carried out in an apparatus identical with that shown diagrammatically in FIG. 2.

The fluidized-bed reactor consists therefore of a cylinder with a vertical side wall having mounted above it a desurging or disengagement chamber (3) mounted above the said cylinder. It has the following characteristics:

internal diameter of the cylinder (1): 5 m height H of the cylinder: 20 m volume of the cylinder: 393 ml internal diameter of the disengagement chamber (3) at the height Lp: 8.66 m height Lp: 28.61 m height of the disengagement vessel: 12.94 m total volume of the disengagement vessel: 403 $m^3$ volume of the disengagement vessel under the height Lp: 338 $m^3$ volume of the disengagement vessel above the height Lp (dome): 65 $m^3$ At its base the reactor has a fluidization grid (4) above which is fluidized a bed of copolymer of ethylene and of 1-butene which has a relative density of 0.950, in the form of a powder consisting of particles which have a mass-average diameter of 750 $\mu$m, 90% by weight of the particles having a diameter ranging from 300 to 1200 $\mu$m. The apparent density of the fluidized powder is 300 kg/$m^3$.

The reaction gas mixture passes through the fluidized bed at an absolute pressure of 2 Mpa with an upward speed of 0.6 m/s, at a temperature of 92° C. It contains, by volume, 30% of ethylene, 1% of 1-butene, 25% of hydrogen and 44% of nitrogen.

A catalyst of the Ziegler-Natta type comprising titanium, magnesium and halogen atoms is prepared in the form of a prepolymer in a manner identical with example 1 of French Patent No. 2 405 961. It is introduced intermittently into the reactor via the entry line (11).

Example C1

After a starting-up stage in which the bed is raised progressively, the bed is stabilized at the height of 17 m, which corresponds to a fluidized bed volume of 334 m$l^3$.

In these conditions, 21.5 tonnes/hour (output rate: 64 kg/h/$m^3$) of copolymer of ethylene and 1-butene are manufactured in the form of a powder which has the characteristics mentioned above.

The polymer output is next increased progressively by changing from 21.5 to 33.2 tonnes/hour over a period of 8 hours while the fluidized bed volume and hence this fluidized bed height of 17 m are kept constant. The appearance of hot spots is then observed, and the production of crusts, which results in stoppage of the reactor.

The only means of avoiding the agglomerates is to limit the output of polymer to approximately 23 tonnes/hour (output rate: 69 kg/h/$m^3$).

Example 2

After a starting-up stage in which the bed is raised progressively, the bed is stabilized at a height of 20 m which corresponds to a fluidized bed volume of 393 $m^3$.

In these conditions 25 tonnes/hour (output rate 64 kg/h/$m^3$) of copolymer of ethylene and 1-butene are manufactured in the form of a powder which has the characteristics mentioned above.

In contrast to the legitimate fears which there may have been in respect of entrainment of the particles out of the reactor, no fouling problem was thus obtained. Not even the least increase in concentration of fine particles has been observed in the outer circulation conduit (5), when compared with Example C1.

The polymer output is next increased progressively changing from 25 to 39 tonnes/hour over a period of 8 hours while the fluidized bed volume and hence this fluidized bed height of 20 mn are kept constant. The appearance of agglomerates is then observed, which makes it necessary to limit the polymer output to approximately 29 tonnes/hour (output rate: 74 kg/h/$m^3$).

Example 3

After a starting-up stage in which the bed is raised progressively, the bed is stabilized at a height of 23 m, that is 3 m in the disengagement vessel, which corresponds to a fluidized bed volume of 468 $m^3$, that is a volume of occupation of the disengagement vessel of 75 $m^3$.

In these conditions 30 tonnes/hour (output rate: 64 kg/h/$m^3$) of copolymer of ethylene and 1-butene are manufactured in the form of a powder which has the characteristics mentioned above.

In contrast to the legitimate tears which there may have been concerning the entrainment of the particles out of the reactor, no fouling problem has been found. Not even the least increase in concentration of fine particles has been observed in the outer circulation conduit (5) in comparison with example C1. In addition, a subsequent study of the general state of the exchangers (6,7) situated in the outer circulation line (5) has proved that these exchangers had undergone a lesser degree of fouling in the case of example 3, when compared with the other two examples.

The polymer output is next increased progressively by changing from 30 to 46.5 tonnes/hour (output rate: 99 kg/h/$m^3$) over a period of 8 hours while the fluidized bed volume and hence this fluidized bed height of 23 m are kept constant. This takes place without the least problem. No presence of hot spots nor appearance of crusts was observed, and this has made it possible to continue the polymerization while maintaining these operating conditions.

We claim:

1. Process for gas phase polymerization of one or more monomers in a fluidized bed reactor, which reactor includes a cylinder above which is mounted a disengagement vessel, wherein the reaction gas mixture passes through the cylinder with an upward speed from 0.3 to 1 m/s, and wherein the fluidized bed occupies at least all of the cylinder.

2. Process according to claim 1, wherein the reaction gas mixture passes through the reactor with an upward speed from 0.4 to 0.8 m/s.

3. Process according to claim 1, wherein the fluidized bed occupies at least partially the disengagement vessel.

4. Process according to claim 1, in which one or more olefinic monomers selected from the group consisting of ethylene, propylene, 1-butene, 1-pentene, 4-methyl-1-pentene, 1-hexene and 1-octene are polymerized.

5. Process for continuous gas phase polymerization of olefin(s) in a reactor containing a fluidized bed, which reactor includes a cylinder with a vertical side wall and a disengagement chamber mounted above the cylinder and in communication therewith, said process comprising operating at an absolute pressure higher than the atmospheric pressure, continuously or intermittently introducing a catalyst into the reactor, continuously passing a reaction gas mixture containing one or more olefin monomers through the fluidized bed in an upward stream at an upward speed ranging from 0.3 to 1 m/s, removing the heat of polymerization by withdrawing and cooling the gaseous stream from the reactor, recycling said cooled gaseous stream back to the reactor, and removing polymer produced, wherein the fluidized bed of the reactor occupies at least all of the cylinder of the reactor.

6. Process according to claim 5, wherein the reaction gas mixture passes through the reactor with an upward speed from 0.4 to 0.8 m/s.

7. Process according to claim 5, wherein the fluidized bed occupies at least partially the disengagement vessel.

8. Process according to claim 5, in which one or more olefinic monomers selected from the group consisting of ethylene, propylene, 1-butene, 1-pentene, 4-methyl-1pentene, 1-hexene and 1-octene are polymerized.

9. Process according to any one of claims 1 and 5, in which polymerization takes place with a polymer output rate higher than 50 kg/h/m$^3$.

10. Process according to claim 9, in which polymerization takes place with a polymer output rate higher than 60 kg/h/m$^3$.

11. Process according to claim 10, in which polymerization takes place with a polymer output rate higher than 70 kg/h/m$^3$.

12. Process according to any one of claims 1 and 5, wherein the fluidized bed occupies more than 5% of the total volume of the disengagement vessel.

13. Process according to claim 12, wherein the fluidized bed occupies more than 10% of the total volume of the disengagement vessel.

14. Process according to claim 13, wherein the fluidized bed occupies more than 15% of the total volume of the disengagement vessel.

15. Process according to any one of claims 1 and 5, wherein the fluidized bed occupies less than 70% of the total volume of the disengagement vessel.

16. Process according to claim 15, wherein the fluidized bed occupies less than 50% of the total volume of the disengagement vessel.

17. Process according to claim 16, wherein the fluidized bed occupies less than 30% of the total volume of the disengagement vessel.

\* \* \* \* \*